(12) United States Patent
Teraoka

(10) Patent No.: US 10,168,509 B2
(45) Date of Patent: Jan. 1, 2019

(54) CAMERA LENS

(71) Applicant: Hiroyuki Teraoka, Shenzhen (CN)

(72) Inventor: Hiroyuki Teraoka, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 24 days.

(21) Appl. No.: 15/257,103

(22) Filed: Sep. 6, 2016

(65) Prior Publication Data

US 2017/0199353 A1 Jul. 13, 2017

(30) Foreign Application Priority Data

Jan. 8, 2016 (JP) .................................. 2016-002532

(51) Int. Cl.
*G02B 13/00* (2006.01)
*G02B 27/00* (2006.01)
*G02B 9/64* (2006.01)
*G02B 9/62* (2006.01)

(52) U.S. Cl.
CPC ........... *G02B 13/0045* (2013.01); *G02B 9/64* (2013.01); *G02B 27/0025* (2013.01); *G02B 9/62* (2013.01)

(58) Field of Classification Search
CPC .... G02B 13/18; G02B 13/00; G02B 13/0045; G02B 13/24; G02B 9/64; G02B 9/62; G02B 27/00; G02B 27/0025; G02B 21/02; G02B 15/177

USPC ................ 359/755, 754, 751, 657, 682, 708
See application file for complete search history.

(56) References Cited

U.S. PATENT DOCUMENTS

| 9,759,894 B2 * | 9/2017 | Teraoka | G02B 13/0045 |
| 2015/0070783 A1 * | 3/2015 | Hashimoto | G02B 13/0045 359/708 |
| 2015/0378131 A1 * | 12/2015 | Tang | G02B 13/0045 359/708 |
| 2016/0124191 A1 * | 5/2016 | Hashimoto | G02B 13/0045 359/708 |

FOREIGN PATENT DOCUMENTS

| JP | 2015-055728 | 3/2015 |
| JP | 2015-072403 | 4/2015 |
| JP | 2015-072405 | 4/2015 |
| JP | 2015-114505 | 6/2015 |

* cited by examiner

*Primary Examiner* — Jie Lei
(74) *Attorney, Agent, or Firm* — Na Xu; IPro, PLLC

(57) ABSTRACT

A camera lens is disclosed. The camera lens includes seven piece ultra-thin and high-luminous flux wide angle lenses with excellent optical properties as follows: a first lens with positive refractive power; a second lens with negative refractive power; a third lens with negative refractive power; a fourth lens with positive refractive power; a fifth lens with positive refractive power; a sixth lens with positive or negative refractive power, and a seventh lens with negative refractive power which are arranged in an order from an object side to an image side. The camera lens satisfies specified conditions.

2 Claims, 5 Drawing Sheets

CAMERA LENS

FIELD OF THE INVENTION

The present invention relates to a camera lens, and more particularly to a camera lens very suitable for mobile phone camera module and WEB camera lens etc. equipped with high-pixel camera elements such as CCD, CMOS etc.

DESCRIPTION OF RELATED ART

In recent years, various camera devices equipped with camera elements such as CCD, CMOS are extensively popular. Along with development on camera lens toward miniaturization and high performance, ultra-thin and high-luminous flux (Fno) wide angle camera lenses with excellent optical properties are needed.

The technology related to the camera lens composed of seven piece ultra-thin and high-luminous flux (Fno) wide angle lenses with excellent optical properties is developed gradually. The camera lens mentioned in the proposal of prior reference documents 1, 2, 3 is composed of seven piece lenses which are arranged sequentially from the object side as follows: a first lens with positive refractive power; a second lens with negative refractive power; a third lens with negative refractive power; a fourth lens with positive refractive power and a fifth lens with positive refractive power; a sixth lens with positive refractive power, a seventh lens with negative refractive power.

The camera lens disclosed in embodiments 5 and 9 of the prior reference document 1 has Fno=1.44 bright, but refractive power distribution of the fifth lens is insufficient and the shape of the fifth lens is improper; so it is not sufficiently ultra-thin.

The camera lens disclosed in embodiment 3 of prior reference document 2 has Fno=1.44 bright, but refractive power distribution of the fifth lens is insufficient and the shape of the fifth lens is improper; so it is not sufficiently ultra-thin.

The camera lens disclosed in embodiment 5 of prior reference document 3 has Fno=1.45 bright, but refractive power distribution of the fifth lens is insufficient and the shape of the fifth lens is improper; so it is not sufficiently ultra-thin.

The camera lens mentioned in the proposal of prior reference document 4 is composed of seven piece lenses which are arranged sequentially from the object side as follows: a first lens with positive refractive power; a second lens with negative refractive power; a third lens with negative refractive power; a fourth lens with positive refractive power, a fifth lens with positive refractive power; a sixth lens with negative refractive power, a seventh lens with negative refractive power.

According to the camera lens disclosed in embodiment 10 of prior reference document 4, refractive power distribution of the fifth lens is insufficient and the shape of the fifth lens is improper. Brightness and ultra-thin are both insufficient.

PRIOR REFERENCE DOCUMENTS

[Prior Reference Document 1] Japan Patent Publication No. JP2015-072403;
[Prior Reference Document 2] Japan Patent Publication No. JP2015-072405;
[Prior Reference Document 3] Japan Patent Publication No. JP2015-114505;
[Prior Reference Document 4] Japan Patent Publication No. JP2015-055728.

Therefore, it is necessary to provide a novel camera lens to solve the above-mentioned technical problem.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENTS

The present invention will hereinafter be described in detail with reference to exemplary embodiments. To make the technical problems to be solved, technical solutions and beneficial effects of present disclosure more apparent, the present disclosure is described in further detail together with the figures and the embodiments. It should be understood the specific embodiments described hereby is only to explain this disclosure, not intended to limit this disclosure.

Figure 1:
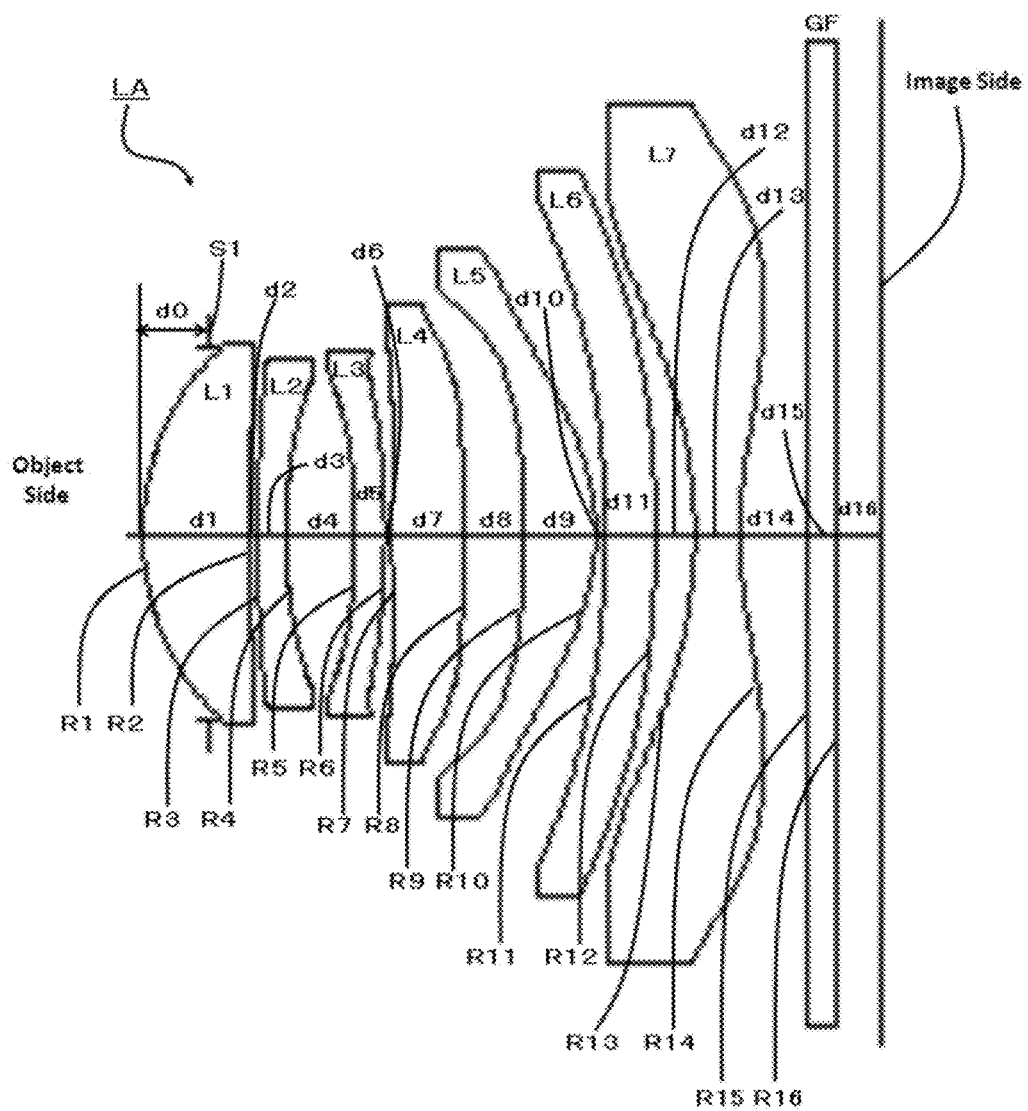
FIG. 1 is an illustrative structure of a camera lens LA of the present disclosure.

A camera lens of the present disclosure shall be explained by referring to the design drawings. Referring to FIG. 1, a camera lens LA comprises seven piece lenses which are arranged in an order from an object side to an imaging surface side, including a first lens L1, a second lens L2, a third lens L3, a fourth lens L4, a fifth lens L5, a sixth lens L6, and a seventh lens L7. A glass plate GF is arranged between the seventh lens L7 and the imaging surface. And a glass cover or an optical filter having the function of filtering IR can serve as the glass plate GF. Moreover, it shall be OK if no glass plate GF is arranged between the seventh lens L7 and the imaging surface.

The first lens has positive refractive power; the second lens has negative refractive power; the third lens has negative refractive power; the fourth lens has positive refractive power; the fifth lens has positive refractive power; the sixth lens has positive or negative refractive power; and the seventh lens has negative refractive power. Moreover, the surfaces of the seven lenses should be designed as the aspheric shape preferably in order to correct the aberration well.

The camera lens LA satisfies the following conditions (1)~(2):

$$0.02 \leq R1/R2 \leq 1.00 \quad (1)$$

$$3.00 \leq R9/R10 \leq 15.00 \quad (2)$$

where,

R1: the curvature radius of the first lens L1's object side surface
R2: the curvature radius of the first lens L1's image side surface
R9: curvature radius of the fifth lens L5's object side surface
R10: curvature radius of the fifth lens L5's image side surface The shape of the first lens L1 is specified in the condition (1). Moreover, the development of ultra-thin and wide angle trend of Fno≤1.8 cannot be implemented easily outside the range of the condition (1).

Therefore, numerical range of condition (1) should be set within the numerical range of the following condition (1-A) preferably, $$0.03 \leq R1/R2 \leq 0.08 \quad (1\text{-}A)$$

The shape of the fifth lens L5 is specified in the condition (2). Moreover, the development of ultra-thin and wide angle trend of Fno≤1.8 cannot be implemented easily outside the range of the condition (2).

Therefore, numerical range of condition (2) should be set within the numerical range of the following condition (2-A) preferably, $$4.00 \leq R9/R10 \leq 11.00 \quad (2\text{-}A)$$

The sixth lens has positive or negative refractive power, and meets following condition (3):

$$0.50 \leq R11/R12 \leq 2.00 \quad (3)$$

where,

R11: curvature radius of the sixth lens L6's object side surface
R12: curvature radius of the sixth lens L6's image side surface The shape of the sixth lens L6 is specified in the condition (3). Moreover, the development of ultra-thin and wide angle trend of Fno≤1.8 cannot be implemented easily outside the range of the condition (3).

Therefore, numerical range of condition (3) should be set within the numerical range of the following condition (3-A) preferably, $$0.70 \leq R11/R12 \leq 1.20 \quad (3\text{-}A)$$

Abbe numbers of the second lens L2, the third lens L3 and the sixth lens L6 meet following conditions (4)~(6):

$$18.00 \leq v2 \leq 32.00 \quad (4)$$

$$18.00 \leq v3 \leq 32.00 \quad (5)$$

$$18.00 \leq v6 \leq 32.00 \quad (6)$$

where, v2: abbe number of the second lens L2
v3: abbe number of the third lens L3
v6: abbe number of the sixth lens L6

Abbe numbers of the second lens L2, the third lens L3 and the sixth lens L6 are specified in conditions (4)~(6). Correction of chromatic aberration on axle and outside of axle becomes easy by setting the numerical values within the range of conditions (4)~(6).

Because seven lenses of camera Lens all have the stated formation and meet all the conditions, so it is possible to produce a camera lens which is composed of seven lenses with excellent optional properties, TTL(optical length)/IH (image height)≤1.55, ultrathin, wide angle 2ω≥75°, Fno≤1.8.

The camera lens LA of the invention shall be explained below by using the embodiments. Moreover, the symbols used in all embodiments are shown as follows. And mm shall be taken as the units of the distance, the radius and the center thickness.

f: overall focal distance of the camera lens LA
f1: focal distance of the first lens L1
f2: focal distance of the second lens L2
f3: focal distance of the third lens L3
f4: focal distance of the fourth lens L4
f5: focal distance of the fifth lens L5
f6: focal distance of the sixth lens L6
f7: focal distance of seventh lens L7
Fno: F value
2ω: total angle of view
S1: aperture
R: curvature radius of optical surface, central curvature radius when the lens is involved
R1: curvature radius of the first lens L1's object side surface
R2: curvature radius of the first lens L1's image side surface
R3: curvature radius of the second lens L2's object side surface
R4: curvature radius of the second lens L2's image side surface
R5: curvature radius of the third lens L3's object side surface
R6: curvature radius of the third lens L3's image side surface
R7: curvature radius of the fourth lens L4's object side surface
R8: curvature radius of the fourth lens L4's image side surface
R9: curvature radius of the fifth lens L5's object side surface
R10: curvature radius of the fifth lens L5's image side surface
R11: curvature radius of the sixth lens L6's object side surface
R12: curvature radius of the sixth lens L6's image side surface
R13: curvature radius of the seventh lens L7's object side surface
R14: curvature radius of the seventh lens L7's image side surface
R15: curvature radius of the glass plate GF's object side surface
R16: curvature radius of the glass plate GF's image side surface
d: center thickness of lenses or the distance between lenses
d0: distance from the open aperture S1 to the object side of the first lens L1
d1: center thickness of the first lens L1
d2: distance from the image side surface of the first lens L1 to the object side surface of the second lens L2
d3: center thickness of the second lens L2
d4: axial distance from the image side surface of the second lens L2 to the object side surface of the third lens L3
d5: center thickness of the third lens L3
d6: axial distance from the image side surface of the third lens L3 to the object side surface of the fourth lens L4
d7: center thickness of the fourth lens L4
d8: axial distance from the image side surface of the fourth lens L4 to the object side surface of the fifth lens L5
d9: center thickness of the fifth lens L5
d10: axial distance from the image side surface of the fifth lens L5 to the object side surface of the sixth lens L6 d11: center thickness of the sixth lens L6
d12: axial distance from the image side surface of the sixth lens L6 to the object side surface of the seventh lens L7
d11: center thickness of the seven lens L7
d14: axial distance from the image side surface of the seventh lens L7 to the object side surface of the glass plate GF
d15: center thickness of the glass plate GF
d16: axial distance from the image side surface to the imaging surface of the glass plate GF
nd: refractive power of line d
nd1: refractive power of line d of the first lens L1
nd2: refractive power of line d of the second lens L2
nd3: refractive power of line d of the third lens L3
nd4: refractive power of line d of the fourth lens L4
nd5: refractive power of line d of the fifth lens L5
nd6: refractive power of line d of the sixth lens L6
nd7: refractive power of line d of the seventh lens L7
nd8: refractive power of line d of the glass plate GF
vd: abbe number
v1: abbe number of the first lens L1
v2: abbe number of the second lens L2
v3: abbe number of the third lens L3
v4: abbe number of the fourth lens L4
v5: abbe number of the fifth lens L5
v6: abbe number of the sixth lens L6
v1: abbe number of the seventh lens L7
v8: abbe number of the glass plate GF
TTL: optical length (axial distance from object side surface to the imaging surface of the first lens L1)
LB: axial distance (including the thickness of the glass plate GF) from the image side surface to the imaging surface of the seventh lens L7;

data including curvature radius R of the object side surfaces and the image side surfaces, center thicknesses of the lenses, the distances d among the lenses, refractive powers nd and abbe numbers v d of the lens L1-L7 in the Embodiment 1 are shown in the Table 1, wherein the camera lens LA is formed by the lens L1-L7; and the data including conic coefficients k and aspheric coefficients are shown in the Table 2.

TABLE 1

| | R | d | | nd | | v d |
|---|---|---|---|---|---|---|
| S1 | ∞ | d0 = | −0.475 | | | |
| R1 | 1.73679 | d1 = | 0.774 | nd1 | 1.5441 | v 1 56.12 |
| R2 | 37.44769 | d2 = | 0.052 | | | |
| R3 | 11.71991 | d3 = | 0.204 | nd2 | 1.6422 | v 2 22.41 |
| R4 | 3.30101 | d4 = | 0.495 | | | |
| R5 | −5.05613 | d5 = | 0.217 | nd3 | 1.6422 | v 3 22.41 |
| R6 | −6.35357 | d6 = | 0.051 | | | |
| R7 | 11.11572 | d7 = | 0.509 | nd4 | 1.5441 | v 4 56.12 |
| R8 | 26.85452 | d8 = | 0.451 | | | |
| R9 | −6.86869 | d9 = | 0.515 | nd5 | 1.5352 | v 5 56.12 |
| R10 | −1.36187 | d10 = | 0.065 | | | |
| R11 | −6.53333 | d11 = | 0.365 | nd6 | 1.6422 | v 6 22.41 |
| R12 | −6.46586 | d12 = | 0.286 | | | |
| R13 | −3.08181 | d13 = | 0.319 | nd7 | 1.5352 | v 7 56.12 |
| R14 | 2.21835 | d14 = | 0.500 | | | |
| R15 | ∞ | d15 = | 0.210 | nd8 | 1.5168 | v 8 64.17 |
| R16 | ∞ | d16 = | 0.320 | | | |

TABLE 2

| | conic coefficient | aspheric coefficient | | | | | | |
|---|---|---|---|---|---|---|---|---|
| | k | A4 | A6 | A8 | A10 | A12 | A14 | A16 |
| R1 | −2.6717E−01 | 8.6506E−03 | 7.6241E−03 | −2.9703E−03 | 6.8153E−04 | 1.6490E−03 | 8.9491E−04 | −1.0337E−03 |
| R2 | 0.0000E+00 | 9.7177E−03 | −3.3264E−03 | 5.8474E−03 | 8.5766E−04 | −3.8927E−03 | −3.1564E−03 | 2.1050E−03 |
| R3 | −2.6816E+00 | −1.0352E−02 | 1.0703E−02 | 4.7468E−03 | −7.5022E−03 | −4.1229E−04 | 1.2876E−03 | 8.0402E−04 |
| R4 | −1.3180E+00 | 2.6635E−03 | 2.7988E−03 | 1.1321E−02 | −7.8714E−04 | −7.0065E−03 | −4.4921E−03 | 1.3476E−02 |
| R5 | 1.7784E+01 | −4.2601E−03 | −2.8602E−02 | −6.4579E−03 | 7.2876E−03 | 6.5086E−03 | 5.2106E−04 | 5.7701E−03 |
| R6 | 2.3798E+01 | −6.8949E−04 | −1.8989E−02 | 1.7447E−03 | 8.7524E−03 | 5.7817E−03 | 1.9411E−03 | −8.9159E−04 |
| R7 | 0.0000E+00 | −6.2436E−02 | 7.2765E−03 | 4.0155E−03 | 8.1038E−04 | 4.9297E−05 | −2.7730E−05 | −9.9144E−05 |
| R8 | 0.0000E+00 | −6.2656E−02 | −3.6090E−03 | 9.1813E−05 | −3.2632E−04 | 7.2576E−05 | 1.3011E−04 | 2.2548E−05 |
| R9 | 7.7515E+00 | −2.6910E−02 | −8.4713E−03 | 9.2514E−04 | −1.2678E−03 | −1.0249E−04 | 7.0432E−05 | 3.8018E−05 |
| R10 | −3.5242E+00 | −3.3545E−02 | 1.2297E−02 | −1.6295E−04 | 3.5213E−05 | −4.6205E−05 | −8.1781E−06 | −1.5223E−07 |
| R11 | 1.0104E+00 | −2.6801E−03 | −1.2654E−04 | 1.2961E−05 | 3.0026E−06 | 1.7191E−07 | 2.9472E−08 | −1.8205E−09 |
| R12 | 1.4678E+00 | −8.3931E−04 | −5.4876E−05 | −1.3307E−05 | −9.4894E−07 | 8.4646E−08 | 4.0654E−08 | 1.4451E−08 |
| R13 | −1.3052E−01 | 1.6728E−04 | 2.6737E−03 | 4.2251E−05 | −1.2348E−05 | −6.4263E−07 | 1.0289E−08 | 6.5823E−09 |
| R14 | −1.5549E+01 | −2.3403E−02 | 3.1358E−03 | −4.3484E−04 | 1.7355E−05 | 5.6217E−07 | 1.5247E−08 | 1.5063E−09 |

IH: image height
$y=(x^2/R)/[1+\{1-(k+1)(x^2/R^2)\}^{1/2}]+A4 \times 4+A6 \times 6+A8 \times 8+A10 \times 10+A12 \times 12+A14 \times 14+A16 \times 16$; where, R indicates the curvature radius on the axle; k indicates the conical coefficient; and A4, A6, A8, A10, A12, A14 and A16 indicates the coefficients of the aspheric surface For convenience sake, the aspheric surface shown in the condition (7) shall be taken as the aspheric surfaces of all lens surfaces. However, the invention shall be not limited to the polynomial form of the aspheric surface shown in the condition (7).

Embodiment 1

Figure 2:
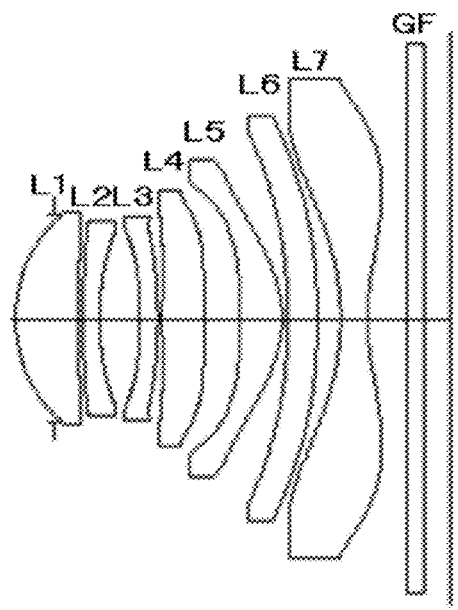
FIG. 2 is an illustrative structure of a camera lens LA in accordance with a first embodiment (Embodiment 1) of the present disclosure.

The configuration structure diagram of the camera lens LA in the Embodiment 1 is shown in FIG. 2. Moreover, the The values in the embodiments 1 and 2 and the values corresponding to the parameters specified in the conditions (1)-(6) are shown in the subsequent Table 5.

The Embodiment 1 meets the conditions (1)-(6), as shown in Table 5.

Figure 3:
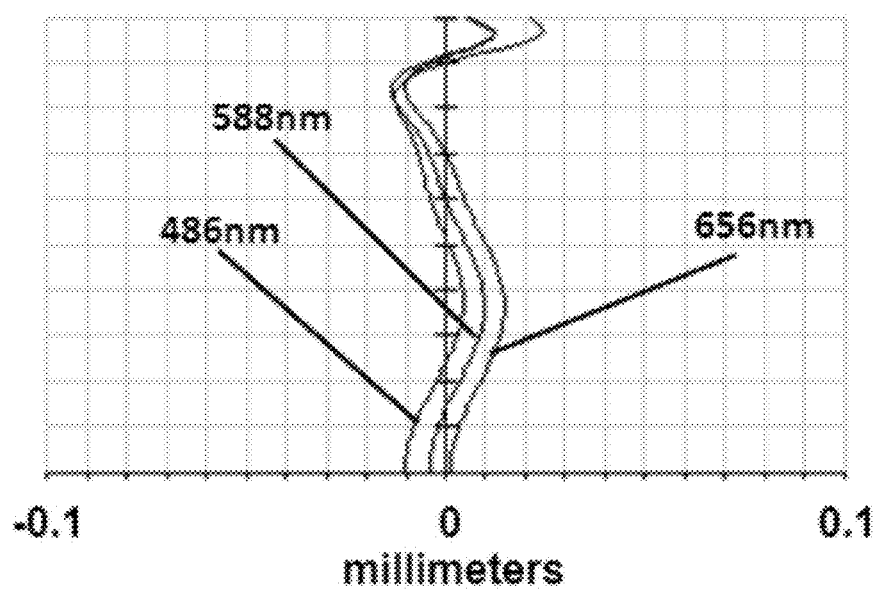
FIG. 3 is a Longitudinal Aberration diagram of the camera lens LA in the Embodiment 1.
Figure 4:
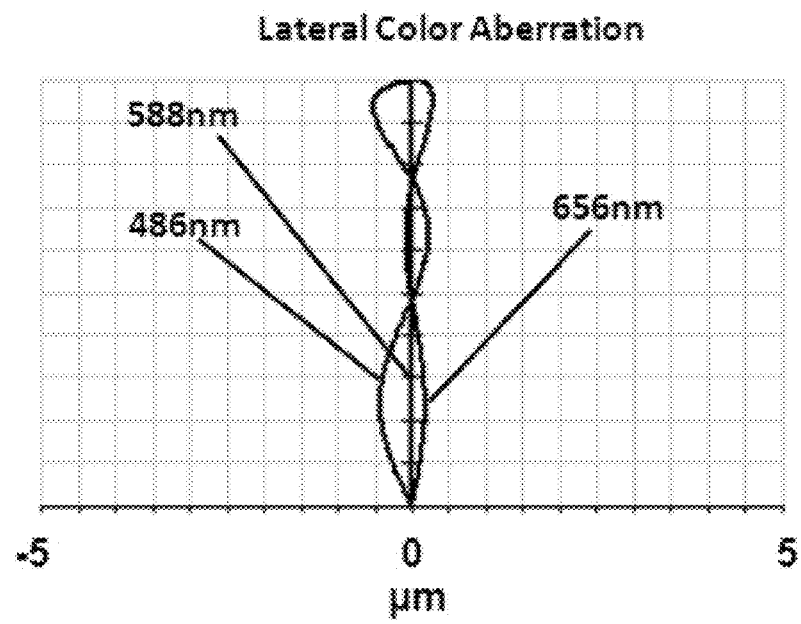
FIG. 4 is a Lateral Color Aberration diagram of the camera lens LA in the Embodiment 1.
Figure 5:
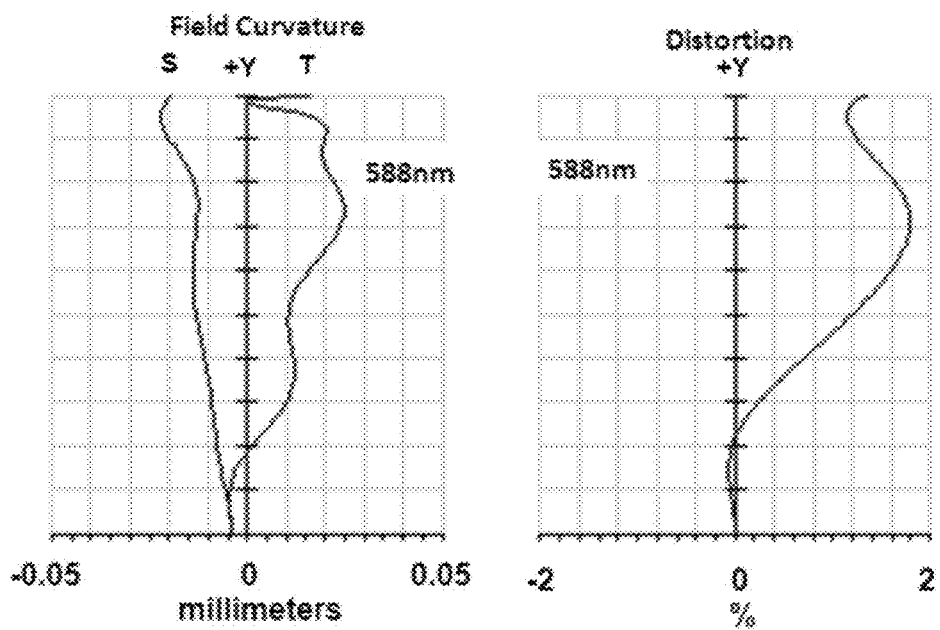
FIG. 5 is a Field Curvature Distortion of the camera lens LA in the Embodiment 1.

Refer to FIG. 3 for Longitudinal Aberration of the camera lens LA in the Embodiment 1, refer to FIG. 4 for Lateral Color Aberration of it, and refer to FIG. 5 for curvature of field and distortion of it. Further, the curvature of field S in the FIG. 5 is the one in the sagittal direction, and T is the one in the direction of meridian, as well as in the Embodiment 2. Moreover, the camera lens LA in the embodiment 1 involves the ultra-thin wide angle camera lens having high luminous flux as shown in FIGS. 3-5, wherein 2ω=76°, TTL/IH=1.535, Fno=1.74; therefore, it is no wonder that this lens has these excellent optical properties.

Embodiment 2

Figure 6:
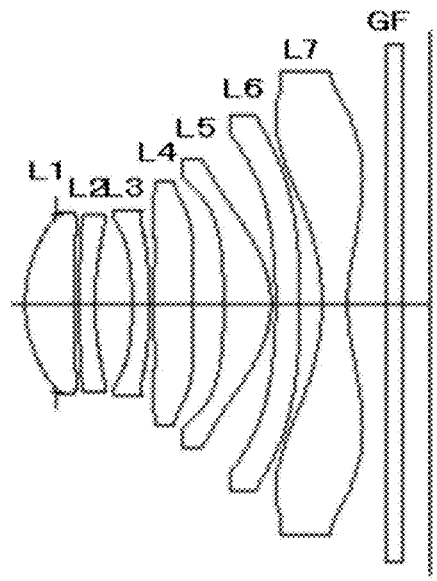
FIG. 6 is an illustrative structure of a camera lens LA in accordance with a second embodiment (Embodiment 2) of the present disclosure.

The configuration structure diagram of the camera lens LA in the Embodiment 2 is shown in the FIG. 6. Moreover, the curvature radius of the object side surfaces and the image side surfaces, the center thicknesses of the lenses, the distances d among the lenses, the refractive powers nd and abbe numbers vd of the lens L1-L7 in the Embodiment 2 are shown in the Table 3, wherein the camera lens LA is formed by the lens L1-L7; and the conic coefficients k and aspheric coefficients are shown in the Table 4.

TABLE 3

| | R | d | | nd | | v d |
|---|---|---|---|---|---|---|
| S1 | ∞ | d0 = −0.399 | | | | |
| R1 | 1.77698 | d1 = 0.634 | nd1 | 1.5441 | v 1 | 56.12 |
| R2 | 50.89532 | d2 = 0.053 | | | | |
| R3 | 10.50150 | d3 = 0.210 | nd2 | 1.6510 | v 2 | 21.51 |
| R4 | 3.36985 | d4 = 0.481 | | | | |
| R5 | −4.98071 | d5 = 0.225 | nd3 | 1.6422 | v 3 | 22.41 |
| R6 | −6.37878 | d6 = 0.051 | | | | |
| R7 | 9.73268 | d7 = 0.507 | nd4 | 1.5441 | v 4 | 56.12 |
| R8 | 12.57164 | d8 = 0.392 | | | | |
| R9 | −10.06326 | d9 = 0.611 | nd5 | 1.5352 | v 5 | 56.12 |
| R10 | −1.22163 | d10 = 0.053 | | | | |
| R11 | −9.70142 | d11 = 0.310 | nd6 | 1.5855 | v 6 | 29.91 |
| R12 | −12.40696 | d12 = 0.286 | | | | |
| R13 | −3.02209 | d13 = 0.328 | nd7 | 1.5352 | v 7 | 56.12 |
| R14 | 2.07780 | d14 = 0.500 | | | | |
| R15 | ∞ | d15 = 0.210 | nd8 | 1.5168 | v 8 | 64.17 |
| R16 | ∞ | d16 = 0.353 | | | | |

TABLE 4

| | conic coefficient | aspheric coefficient | | | | | | |
|---|---|---|---|---|---|---|---|---|
| | k | A4 | A6 | A8 | A10 | A12 | A14 | A16 |
| R1 | −2.4629E−01 | 8.2979E−03 | 7.6019E−03 | −4.7157E−03 | 4.2144E−04 | 2.9451E−03 | 1.3204E−03 | −2.5303E−03 |
| R2 | 0.0000E+00 | 1.2431E−02 | −5.7931E−03 | 4.5976E−03 | −5.0813E−05 | −5.8518E−03 | −3.2053E−03 | 3.1702E−03 |
| R3 | −4.2420E+00 | −1.2083E−02 | 1.0001E−02 | 1.8548E−03 | −9.8072E−03 | −1.5566E−03 | 1.4001E−03 | 3.5861E−03 |
| R4 | −3.4925E+00 | −4.3957E−03 | −4.9223E−03 | 3.7174E−03 | −6.6181E−03 | −8.8995E−03 | −4.1366E−03 | 1.1910E−02 |
| R5 | 1.8526E+01 | −1.1480E−02 | −3.8868E−02 | −2.1191E−02 | −2.5932E−03 | 4.8983E−03 | 5.1706E−03 | 1.1960E−02 |
| R6 | 2.5180E+01 | 2.5280E−03 | −2.4560E−02 | −1.2118E−03 | 9.1151E−03 | 7.6258E−03 | 3.4165E−03 | −7.6629E−04 |
| R7 | 0.0000E+00 | −6.7882E−02 | 1.2195E−02 | 6.7487E−03 | 4.2506E−04 | −5.3341E−04 | −2.0007E−04 | 6.6490E−05 |
| R8 | 0.0000E+00 | −7.3033E−02 | −7.6011E−06 | −1.1057E−04 | −6.4387E−04 | −6.3813E−05 | 1.7084E−04 | 6.3558E−05 |
| R9 | 1.8505E+01 | −3.9669E−02 | −3.5198E−03 | 9.6396E−04 | −1.6921E−03 | −2.2973E−04 | 7.7450E−05 | 6.5205E−05 |
| R10 | −3.2116E+00 | −5.3237E−02 | 1.5821E−02 | 4.4059E−04 | 3.0528E−05 | −6.4677E−05 | −1.2171E−05 | 5.6538E−07 |
| R11 | 1.0565E+00 | −1.3447E−02 | −4.0864E−04 | 1.3071E−05 | 3.3941E−06 | 2.8496E−06 | 7.6167E−07 | −3.4169E−08 |
| R12 | 1.2509E+01 | −1.1585E−02 | 1.8557E−04 | 3.0703E−05 | 9.6976E−07 | −1.1777E−06 | −5.9351E−08 | 7.5700E−08 |
| R13 | −1.1273E−01 | 2.7039E−03 | 2.7019E−03 | 3.7461E−05 | −1.3600E−05 | −6.9287E−07 | 2.0207E−08 | 9.9132E−09 |
| R14 | −1.3904E+01 | −2.4062E−02 | 3.5291E−03 | −4.8138E−04 | 1.9758E−05 | 1.0185E−06 | 1.9068E−08 | −4.2704E−09 |

The Embodiment 2 meets the conditions (1)-(6), as shown in Table 5.

Figure 7:
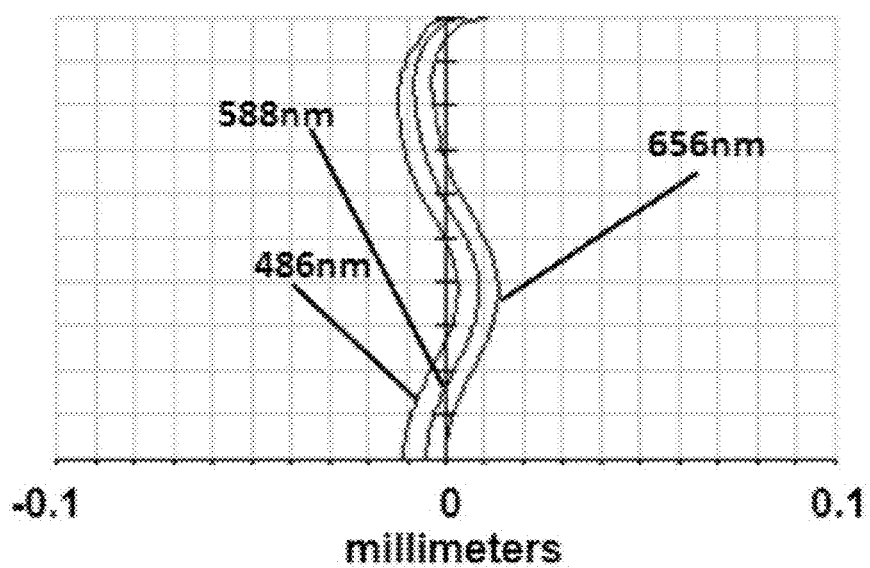
FIG. 7 is a Longitudinal Aberration diagram of the camera lens LA in the Embodiment 2.
Figure 8:
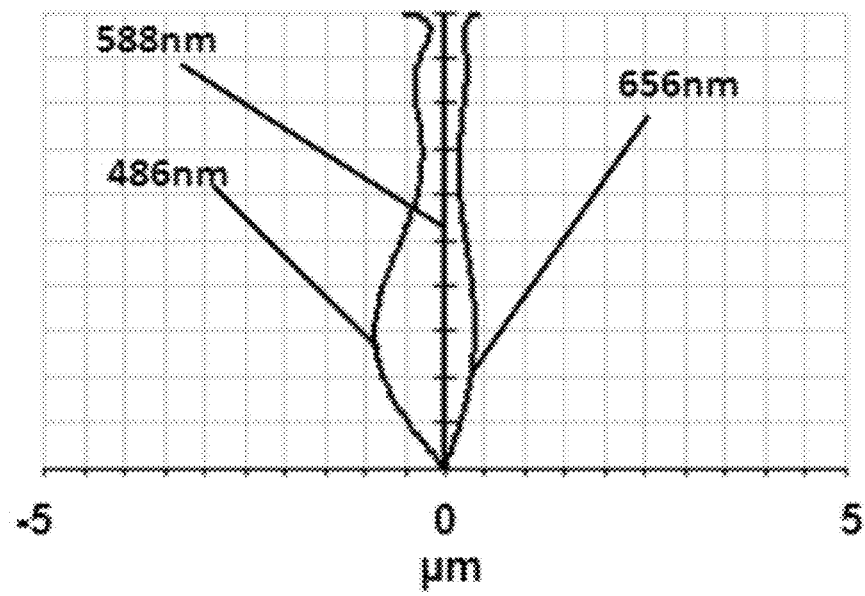
FIG. 8 is the Lateral Color Aberration diagram of the camera lens LA in the Embodiment 2.
Figure 9:
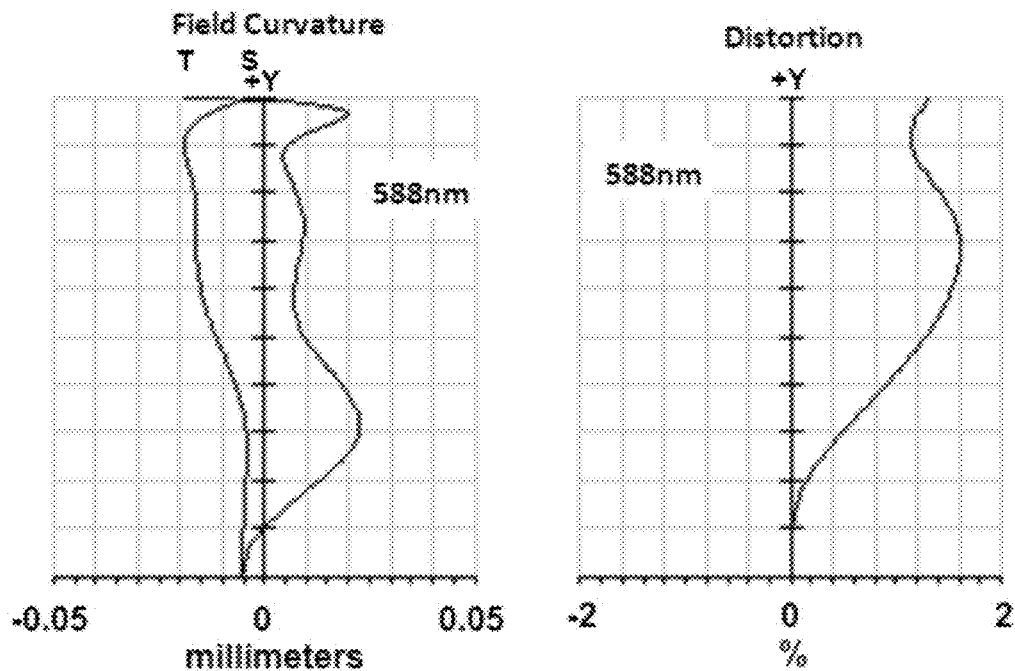
FIG. 9 is a Field Curvature Distortion of the camera lens LA in the Embodiment 2.

Refer to FIG. 7 for Longitudinal Aberration of the camera lens LA in the Embodiment 2, refer to FIG. 8 for Lateral Color Aberration of it, and refer to FIG. 9 for curvature of field and distortion of it. Moreover, the total angle of view is involved in the camera lens LA in the Embodiment 2 as shown in FIGS. 7-9, and the lens refers to the ultra-thin wide angle camera lens having high luminous flux, wherein 2ω=80.0°, TTL/IH=1.498, Fno=1.78; therefore, it is no wonder that this lens has these excellent optical properties.

The values in all embodiments and the values corresponding to the parameters specified in the conditions (1)-(6) are shown in the Table 5. Moreover, the units including 2ω(°), f(mm), f1(mm), f2(mm), f3(mm), f4(mm), f5(mm), f6(mm), f7(mm), TTL(mm), LB(mm) and IH(mm) are shown in the Table 5, respectively.

TABLE 5

| | Embodiment 1 | Embodiment 2 | Condition |
|---|---|---|---|
| R1/R2 | 0.046 | 0.035 | (1) |
| R9/R10 | 5.044 | 8.238 | (2) |
| R11/R12 | 1.010 | 0.782 | (3) |
| v2 | 22.41 | 21.51 | (4) |
| v3 | 22.41 | 22.41 | (5) |
| v6 | 22.41 | 29.91 | (6) |
| Fno | 1.74 | 1.78 | |
| 2ω | 76.0 | 80.0 | |
| TTL/IH | 1.535 | 1.498 | |
| f | 4.379 | 4.083 | |
| f1 | 3.322 | 3.369 | |
| f2 | −7.225 | −7.713 | |
| f3 | −41.257 | −37.766 | |
| f4 | 34.467 | 74.524 | |
| f5 | 3.074 | 2.537 | |
| f6 | 312.977 | −79.350 | |
| f7 | −2.361 | −2.250 | |
| TTL | 5.333 | 5.204 | |
| LB | 1.030 | 1.063 | |
| IH | 3.475 | 3.475 | |

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A camera lens, comprising in order from an object side to an image side:
   a first lens with positive refractive power;
   a second lens with negative refractive power;
   a third lens with negative refractive power;
   a fourth lens with positive refractive power;
   a fifth lens with positive refractive power;
   a sixth lens with positive or negative refractive power;
   a seventh lens with negative refractive power; wherein the camera lens satisfying the following conditions (1)~(3):

$$0.02 \leq R1/R2 \leq 1.00 \quad (1);$$

$$3.00 \leq R9/R10 \leq 15.00 \quad (2);$$

$$0.50 \leq R11/R12 \leq 1.20 \quad (3);$$

where,
R1: curvature radius of the first lens' object side surface;
R2: curvature radius of the first lens' image side surface;
R9: curvature radius of the fifth lens' object side surface;
R10: curvature radius of the fifth lens' image side surface;
R11: curvature radius of the sixth lens' object side surface;
R12: curvature radius of the sixth lens' image side surface.

2. The camera lens as described in claim 1 further satisfying the following conditions (4)~(6):

$$18.00 \leq v2 \leq 32.00 \quad (4);$$

$$18.00 \leq v3 \leq 32.00 \quad (5);$$

$$18.00 \leq v6 \leq 32.00 \quad (6);$$

where,
v2: abbe number of the second lens;
v3: abbe number of the third lens;
v6: abbe number of the sixth lens.

* * * * *